United States Patent [19]

Ogita et al.

[11] Patent Number: 5,430,069
[45] Date of Patent: Jul. 4, 1995

[54] PRE-EXPANDED PARTICLES OF POLYETHYLENE RESIN

[75] Inventors: Tetsuya Ogita, Takasago; Kenichi Senda, Hirakata, both of Japan

[73] Assignee: Kanegafuchi Kagaku Kogyo Kabushiki Kaisha, Osaka, Japan

[21] Appl. No.: 79,775

[22] Filed: Jun. 22, 1993

[30] Foreign Application Priority Data

Jun. 22, 1992 [JP] Japan .................................. 4-163059

[51] Int. Cl.$^6$ .............................................. C08J 9/16
[52] U.S. Cl. ...................................... 521/60; 521/56; 521/58
[58] Field of Search .............................. 521/56, 60, 58

[56] References Cited

U.S. PATENT DOCUMENTS 4,968,723 11/1990 Senda et al. ........................ 521/50

FOREIGN PATENT DOCUMENTS

| 095109 | 11/1983 | European Pat. Off. . |
| 279455 | 8/1988 | European Pat. Off. . |
| 296438 | 12/1988 | European Pat. Off. . |
| 59-187036 | 10/1984 | Japan . |
| 61-51008 | 3/1986 | Japan . |
| 1-135806 | 5/1989 | Japan . |

*Primary Examiner*—Morton Foelak
*Attorney, Agent, or Firm*—Armstrong, Westerman, Hattori, McLeland & Naughton

[57] ABSTRACT

A pre-expanded particle of a polyethylene resin based on a non-crosslinked linear very low density polyethylene having a density of 0.88 to 0.915 g/cm$^3$ and a melt index of 0.1 to 20 g/10 min. which can be used to produce a cellular molded article having superior flexibility, excellent bonding together of the particles, and both large tensile strength and large elongation at break.

6 Claims, No Drawings

PRE-EXPANDED PARTICLES OF POLYETHYLENE RESIN

BACKGROUND OF THE INVENTION

The present invention relates to pre-expanded particles of a polyethylene resin. More particularly, the invention relates to pre-expanded particles of a polyethylene resin which are applicable to a process for producing cellular molded articles by heating pre-expanded particles with a heating medium, such as steam, in a mold which can be closed but cannot be hermetically sealed.

Polyethylene resin foams are widely used as cushioning packaging material for high-grade goods such as office automation equipment, as a result of their good flexibility and their superior toughness and lack of brittleness compared to polystyrene and polypropylene resin foams. In these polyethylene resin foams, polyethylene resins such as crosslinked low density polyethylene, non-crosslinked linear low density polyethylene, and the like, can be used; however, since the resin densities of these kinds of low density polyethylene generally exceed 0.915 g/cm$^3$, the obtained foams are too hard to use for softer cushioning applications, and in addition, have limited toughness. Improved flexibility can be obtained by using a copolymer, such as ethylene with vinyl acetate, which gives a softer pre-expanded particle. However, the melting point of this kind of ethylenevinyl acetate copolymer is low, with the result that the obtained foam has a poor heat resistance.

Japanese Unexamined Patent Publication (Tokkyo Kokai) No. 61-51008 discloses a polyethylene resin pre-expanded particle made using a crosslinked linear very low density polyethylene. However, when this kind of crosslinked linear very low density polyethylene is used, the melt viscosity of the obtained pre-expanded particles is increased and a higher pressure of heating medium is required during molding, compared to the case of using a non-crosslinked compound. This is disadvantageous with respect to the molding cost and cycle. Moreover, a further disadvantage is that recycling is difficult because of the crosslinking of the polyethylene.

The present invention has been realized in consideration of these kinds of problems inherent in the previous technology. Accordingly, an object of the present invention is to provide pre-expanded particles of a polyethylene resin, which can produce cellular molded articles having superior properties, such as flexibility, toughness, tensile strength, and so forth.

SUMMARY OF THE INVENTION

In accomplishing the foregoing and related objects, the present invention provides a pre-expanded particle of a polyethylene resin which is based on a non-crosslinked linear very low density polyethylene having a density of 0.88 to 0.915 g/cm$^3$ and a melt index of 0.1 to 20 g/10 min.

The pre-expanded particle of the present invention preferably exhibits at least two endothermic peaks on the endothermic curve obtained by raising the temperature of the particles to 200° C. at a rate of 10° C./min. using a differential scanning calorimeter. Moreover, it is preferable that the temperature difference between the highest temperature peak and the lowest temperature peak of the endothermic curve is not less than 10° C.

In addition, in the present invention, it is preferable that the pre-expanded particle is produced by a method comprising the following steps:

(a) particles of a non-crosslinked linear very low density polyethylene resin are dispersed in water in a pressure vessel;

(b) a volatile blowing agent is inserted into the pressure vessel;

(c) the dispersion is heated at a temperature near the melting point of the resin particles under a pressure not less than the vapor pressure which the blowing agent shows at that temperature, so that the resin particles become impregnated with the blowing agent; and (d) while maintaining constant the pressure and temperature in the pressure vessel, the mixture of resin particles and water is released from the pressure vessel into an atmosphere of lower pressure than the pressure in the vessel, thereby expanding the resin particles to produce the pre-expanded particles of the polyethylene resin.

In the pre-expanded particles of the present invention, the use of a very low density polyethylene results in the pre-expanded particles and molded articles prepared therefrom having superior flexibility compared with those made using conventional polyethylene resins.

In addition, in the present invention, a consequence of using a non-crosslinked resin as the polyethylene resin is that, because molding can be carried out at low pressures of heating medium, the molding is favorable from the viewpoints of molding cost and cycle. Moreover, a further consequence of using a non-crosslinked resin is that recycling can be easily carried out.

These and other aspects and advantages of the present invention will become better understood with regard to the following description and appended claims.

DETAILED DESCRIPTION

The non-crosslinked linear very low density polyethylene (non-crosslinked LVLDPE) used in the present invention is prepared by copolymerization of ethylene and a $C_4$ to $C_{20}$ α-olefin, and has a linear molecular structure, a density of 0.88 to 0.915 g/cm$^3$, preferably 0.88 to 0.91 g/cm$^3$, and a melt index at 190° C. of 0.1 to 20 g/10 min., preferably 0.1 to 10 g/10 min.

In the case where the density of the non-crosslinked LVLDPE is less than 0.88 g/cm$^3$, the melting point is lowered and the rigidity becomes too small, so that the obtained foam is not fit for practical use. When the density of the non-crosslinked LVLDPE exceeds 0.915 g/cm$^3$, the obtained foam is not imparted with the desired flexibility.

When the melt index of the non-crosslinked LVLDPE is less than 0.1 g/10 min., the expandability of the resin particle is reduced, and when the melt index exceeds 20 g/10 min., open cells occur in the particles during expansion and molding because the melt viscosity is too low.

The polyethylene resin used in the present invention may be combined with various additives such as ultraviolet absorber, antistatic agent, heat stabilizer, flame retarder, coloring agent, filler, and the like, as occasion demands. The amount of additive used is suitably adjusted according to the additive type, and the amount, type, and so forth, of resin used.

Furthermore, an inorganic nucleating agent may be combined with the polyethylene resin, as occasion demands. This enables the formation of pre-expanded particles having uniform cells with a diameter of 40 to 1000 μm. Examples of the inorganic nucleating agent are talc, silica, calcium silicate, calcium carbonate, aluminum chloride, titanium oxide, diatomite, clay, sodium bicarbonate, barium sulfate, bentonite, and the like. The inorganic nucleating agent can be used alone, or two or more types simultaneously. However, of these, talc and silica are preferred. It is desirable that the amount of nucleating agent is 0.001 to 5 parts by weight, preferably 0.003 to 1 part by weight, and more preferably 0.005 to 0.5 part by weight, per 100 parts by weight of the polyethylene resin. When the amount of nucleating agent is less than 0.001 part by weight, there is a tendency that it becomes difficult to obtain pre-expanded particles having uniform cells. When the amount of nucleating agent exceeds 5 parts by weight, the diameter of the pre-expanded particle tends to be too small.

It is preferable that the polyethylene resin already has, prior to pre-expansion, the desired particle shape, such as cylindrical, elliptical, spherical, cubic, rectangular, and so forth, formed beforehand by melting and pelletizing, using, for example, an extruder, kneader, Banbury mixer, roller, and the like. The size of this resin particle is usually from about 0.25 to about 10 mm, and preferably from about 0.5 to about 6 mm. Usually, the above-mentioned additives and inorganic nucleating agents are compounded with the polyethylene resin prior to shaping the resin into the desired particle shape.

The following manufacturing process is given as an example of a suitable method for producing the pre-expanded particles of the present invention. In a pressure vessel, polyethylene resin particles are dispersed in water, and a volatile blowing agent is inserted into the pressure vessel. The dispersion is heated to a temperature near the melting point of the resin particles under a pressure not less than the vapor pressure that the blowing agent shows at that temperature, to impregnate the blowing agent into the resin particles. While the temperature and pressure in the pressure vessel are maintained constant, the mixture of water and resin particles impregnated with blowing agent is released from the pressure vessel into an atmosphere of a lower pressure than the atmosphere in the vessel. The temperature and pressure during the release of the water dispersion should be kept constant, and preferably at the same levels as prior to the release, by introducing into the pressure vessel a pressurized gas such as an inorganic gas, for example, nitrogen, or an organic blowing agent. According to this manufacturing process, the release of the water dispersion is carried out by opening one end of the pressure vessel to release the mixture from the pressure vessel through an orifice having a small opening of, for example, from 1 to 10 mm diameter, into a lower pressure atmosphere, such as an air atmosphere, thereby expanding the resin particles so that pre-expanded particles having a uniform cell structure can be produced. Furthermore, by heating this resin particle in the pressure vessel at a temperature near the melting point of the resin particle, resin particles having at least two endothermic peaks measured by differential thermal analysis using a differential scanning calorimeter (DSC) (Model DSC-220, made by Seiko Instruments Inc.) can easily be obtained.

Hydrocarbons and halogenated hydrocarbons having a boiling point of −50° to 120° C. are used in the present invention as volatile blowing agents. Examples of the hydrocarbon and halogenated hydrocarbon blowing agents are aliphatic hydrocarbons such as propane, butane, pentane, hexane, and the like, cyclic aliphatic hydrocarbons such as cyclobutane, cyclopentane, and the like, and halogenated hydrocarbons such as trichlorofluoromethane, dichlorofluoromethane, dichlorodifluoromethane, dichlorotetrafluoroethane, chloromethane, chloroethane, and the like. The volatile blowing agent can be used alone, or two or more types simultaneously. However, from the viewpoint of having both a low energy for heating and a practically useful blowing pressure, propane, butane, pentane, hexane and heptane are especially preferred.

The amount of volatile blowing agent used is decided according to the type of polyethylene resin particle, the desired expansion ratio of the pre-expanded particle, and the ratio of the volume of resin particles to the volume of space in the pressure vessel. In the present invention, usually from 5 to 40 parts by weight, preferably from 5 to 35 parts by weight, of the blowing agent per 100 parts by weight of the resin particles, are incorporated. When the amount of blowing agent used is less than 5 parts by weight, there is a tendency to obtain only pre-expanded particles having a low expansion ratio. When the amount used is more than 40 parts by weight, the cell size of the pre-expanded particles becomes too small, and there is a tendency for open cells to occur extensively.

In the present invention, the polyethylene resin particles are dispersed in water in the presence of a small amount of a dispersing agent, used in order to prevent the resin particles from agglomerating with each other during heating. The amount of dispersing agent used is from 0.1 to 10 parts by weight, per 100 parts by weight of the resin particles. When the amount of dispersing agent used is less than 0.1 part by weight, the dispersing becomes unstable, the resin particles begin to agglomerate, and expansion becomes difficult. Here, even when expansion does occur, there is a tendency for blocking of the pre-expanded particles together, so that good pre-expanded particles cannot be obtained. Furthermore, when the amount of dispersing agent is more than 10 parts by weight, a large amount of the dispersing agent adheres to the surface of the obtained pre-expanded particles, so that there is a tendency that these do not fuse together during heating for molding. Examples of the dispersing agent are water-soluble polymers such as polyvinyl alcohol, methyl cellulose, poly-N-vinyl pyrrolidone, and the like, and a fine powder of an insoluble or slightly soluble inorganic material such as calcium phosphate, magnesium pyrophosphate, zinc carbonate, and the like, where the inorganic fine powder is used in combination with a small amount of an anionic surface active agent such as sodium alkylbenzene sulfonate, sodium n-paraffin sulfonate, sodium alkylsulfonate, sodium α-olefin sulfonate, and the like. Of these, since water pollution occurs easily when a water-soluble polymer is used, it is preferable to use an inorganic fine powder. However, if a large amount of this kind of inorganic fine powder is used, the obtained pre-expanded particles are not effectively fused together on heating for molding. In order to decrease the amount of inorganic fine powder, it is preferable to use a small amount of an anionic surface active agent in combination. When the insoluble inorganic fine powder and the anionic surface active agent are used in combination, the preferred amounts are from 0.1 to 5 parts by weight and 0.001 to 0.5 parts by weight, respectively, per 100 parts by weight of the resin particles.

The heating temperature during pre-expansion varies according to the resin particle type, the volatile blowing agent type, and so forth. However, when carrying out this invention, the temperature is typically within the range of $-25°$ to $+10°$ C., preferably $-20°$ to $+5°$ C., of the melting point of the resin particles. When the temperature is lower than 25° C. below the melting point of the resin particles, the blowing agent is not uniformly impregnated and the impregnation is slower, so that there is a tendency for the expansion ratio to vary widely. When the temperature is more than 10° C. above the melting point of the resin, there is a tendency for the walls of the cells in the pre-expanded particles to split open and join up because the melt viscosity is too low.

The pressurization during pre-expansion, which is to be not less than the vapor pressure that the volatile blowing agent shows at the temperature used for the pre-expansion process, is from about 10 to about 40 $kg/cm^2$ G, preferably about 10 to about 35 $kg/cm^2$ G.

The water composition is usually set so that the comparative weight ratio of the resin particles to the water is from 1/0.5 to 1/10, preferably from 1/1 to 1/6.

The thus-obtained pre-expanded particles of the present invention preferably show at least two endothermic peaks on the endothermic curve obtained by raising the temperature to 200° C. at a rate of 10° C./min. using DSC, which can be effectively achieved by heating the polyethylene particles near the melting point of the resin, so that the temperature dependence of the melt viscosity of the resin is made small, and the allowable molding range is widened. The temperature difference between the endothermic peaks varies according to the molecular structure, crystal structure and thermal history of the resin, the amount of blowing agent, the expansion temperature and pressure, and so forth, used. However, from the viewpoint of having a wide molding range and obtaining a molded article with low shrinkage and good appearance, it is preferred in the present invention that the temperature difference between the highest temperature peak and the lowest temperature peak is not less than 10° C. In the case where there are two endothermic peaks, usually the lower temperature peak is preferably in the range of 70° to 110° C. and the higher temperature peak is preferably in the range of 100° to 130° C.; however, when using different types of polyethylene resin, the endothermic peaks may lie outside these temperature ranges.

The pre-expanded particles of the present invention have an average cell diameter of 40 to 1000 μm, preferably 60 to 600 μm. When the average cell diameter is less than 40 μm, the cell walls become thin and split open easily during molding, so that the molding tends to shrink easily. When the average cell diameter is more than 1000 μm, there is a tendency for the cell diameter to easily become non-uniform, so that the obtained molded articles do not have a good appearance.

When using the pre-expanded particles of the present invention, the particles may be subjected to molding immediately after their formation, or after aging at a suitable temperature and time and drying. Alternatively, immediately after formation of the pre-expanded particles, or after aging at a suitable temperature and time and drying, expandability may be further imparted to the particles prior to molding, for example, by aging under pressure in order to give pressure to the expanded particles.

As an example of process for molding a foam from the pre-expanded particles of the present invention, the pre-expanded particles are filled in a mold which is able to be closed but unable to be hermetically sealed, and are heated with a fluid heating medium such as steam, at a temperature of about 105° to about 140° C. for about 3 seconds to about 2 minutes, to form a cellular molded article.

In comparison to cellular molded articles obtained using conventional thermoplastic resin pre-expanded particles, the molded articles made by molding the pre-expanded particles of the present invention have superior flexibility, tensile strength at break, elongation, and so forth, and are therefore suitable for various uses such as cushioning material, and the like.

The present invention is more specifically described and explained by means of the following Examples, in which all parts are by weight unless otherwise noted. It is to be understood that the present invention is not limited to the Examples, and various changes and modifications may be made in the invention without departing from the spirit and scope thereof.

EXAMPLES 1 TO 5 AND COMPARATIVE EXAMPLES 1 to 5

The polyethylene resins shown in Table 1 were melted and pelletized in an extruder to give cylindrical pellets having a particle weight of about 5 mg. Here, the resin used in Comparative Example 5 was obtained by crosslinking the non-crosslinked LVLDPE of Example 3. Crosslinking was carried out by charging a 10 liter pressure vessel with 100 parts of the polyethylene resin, 1 part of basic calcium tertiary phosphate powder and 0.006 part of sodium n-paraffin sulfonate as dispersing agent, 0.3 part of dicumylperoxide, and 300 parts of water, and heating at 150° C. for 2 hours.

A 10 liter pressure vessel was charged with 100 parts of the obtained polyethylene resin pellets, 3 parts of basic calcium tertiary phosphate and 0.08 part of sodium n-paraffin sulfonate as dispersing agent, and 300 parts of water. After adding isobutane as a volatile blowing agent to the pressure vessel, in the amounts shown in Table 2, the dispersion was heated to 100° to 140° C., and the inner pressure of the vessel was adjusted to the values shown in Table 2. These conditions were maintained for 30 minutes, after which a valve provided at a lower part of the vessel was opened to release the water dispersion into atmospheric pressure through an opening with a diameter of 4.4 mm in an orifice plate, to give pre-expanded particles. During the release, the inner pressure of the vessel was kept at the same level as prior to the release of the water dispersion by supplying pressurized nitrogen gas into the pressure vessel. After drying at 40° C. for 24 hours, the obtained pre-expanded particles were imparted with the inner pressures shown in Table 2 in a pressurized tank. Following this, the pre-expanded particles were filled in a metal mold of dimensions 300 mm by 170 mm by 40 mm, and heated at 105° to 120° C. for 3 seconds to 1 minute using steam of the pressures shown in Table 3, thereby molding a cellular molded article in the mold. The obtained molded article was removed from the mold and dried at 60° C. for 24 hours.

The average cell diameter of the obtained pre-expanded particles, as well as the moldability, melt bonding, flexibility, tensile strength at break and elongation at break of the cellular molded articles were measured and evaluated using the methods described below. The results are shown in Table 3.

The melting point of the resin was measured using DSC, corresponding to Japanese Industrial Standard (JIS) K 7121 (testing methods for transition temperatures of plastics). The temperature of the pre-expanded particles was raised to 200° C. at a rate of 10° C./min. ("first heating run"), cooled to room temperature at a rate of 10° C./min. to crystallize, and then heated again at a rate of 10° C./min. ("second heating run"). According to this method, by canceling the thermal history of the resin through the first melting and by using a constant rate of cooling, the accurate melting temperature of the resin can be obtained from the peak temperature in the endothermic curve during the second heating run. The resins of Example 1 to 5 and Comparative Example 1 gave complex endothermic curves, and in these cases, the values of melting point given in Table 1 were taken from the highest temperature endothermic peaks. The resins of Comparative Examples 1 to 4 had only a single endothermic peak and the melting point was taken as this value.

The temperature difference between the two endothermic peaks in the endothermic curve obtained by raising the temperature of the pre-expanded particles to 200° C. at a rate of 10° C./min., during the first heating run of the DCS measurement, described above, are shown in Table 2.

The expansion ratios of the pre-expanded particles, obtained by dividing the base resin density by the density of the pre-expanded particles measured from the volume displaced when the pre-expanded particles are immersed in water, are also given in Table 2.

The "Overall appraisal" of the molding of the cellular molded articles given in Table 3 is obtained by considering the appraisal for each of the five properties of the cellular molded articles shown in Table 3. Thus, when all of the appraisals have the symbol ◯, the overall appraisal is said to be good, and where one or more of the appraisals contains the symbol X, the overall appraisal is said to be bad.

The average cell diameter was determined by cutting the pre-expanded particles, and, using a microscope, measuring the average diameter of the observed circular holes along a 2 mm line, by use of the following equation:

$$\text{average cell diameter} = 2 \text{ mm/number of cells on 2 mm line}$$

The moldability of the obtained pre-expanded particles was evaluated by determining the minimum steam pressure for molding, according to the following criteria:
◯: steam pressure less than 1.0 kg/cm² G;
△: steam pressure less than 2.0 kg/cm² G, but not less than 1.0 kg/cm² G;
X: steam pressure not less than 2.0 kg/cm² G.

The melt bonding of the molded articles was assessed as follows. At a position 30 mm from the end of a 40 mm thick by 170 mm wide by 300 mm long cellular molded article, a 5 mm deep cut was made in the direction of the thickness using a cutter. This part of the molded article was then bent by 90 degrees along the line of the cut, and an appraisal made according to the criteria shown below:
◯: molding piece is not broken;
△: molding piece is slightly broken;
X: molding piece is easily broken.

To determine the flexibility, a compressive strength test, corresponding to JIS K 6767 (polyethylene foam testing method), was carried out, and using the strength indicated at 50% compression, an appraisal was made based on the following criteria:
◯: strength at 50% compression is less than 1.0 kg/cm²;
△: strength at 50% compression is less than 1.5 kg/cm², but not less than 1.0 kg/cm²;
X: strength at 50% compression is not less than 1.5 kg/cm².

Tensile strength and elongation at break were measured according to JIS K 6767 (tensile strength testing method), and appraised using the following criteria:
(a) tensile strength at break:
◯: not less than 3.0 kg/cm²;
△: less than 3.0 kg/cm², but not less than 2.0 kg/cm²;
X: less than 2.0 kg/cm².
(b) elongation at break:
◯: not less than 80%;
△: less than 80%, but not less than 50%;
X: less than 50%.

TABLE 1

| Example No. | Polyethylene resin type | Base resin Density (g/cm³) | Melt index (g/10 min.) | Melting point (°C.) |
|---|---|---|---|---|
| 1 | non-crosslinked linear very low density polyethylene (EXCELLEN EUL-130, made by Sumitomo Chemical Co. Ltd,) | 0.890 | 0.8 | 111 |
| 2 | non-crosslinked linear very low density polyethylene (EXCELLEN VL-100, made by Sumitomo Chemical Co. Ltd.) | 0.900 | 0.8 | 112 |
| 3 | non-crosslinked linear very low density polyethylene (EXCELLEN VL-200, made by Sumitomo Chemical Co. Ltd.) | 0.900 | 2.0 | 112 |
| 4 | non-crosslinked linear very low density polyethylene (EXCELLEN VL-700, made by Sumitomo Chemical Co. Ltd.) | 0.905 | 10 | 115 |
| 5 | non-crosslinked linear very low density polyethylene (EXCELLEN VL-102, made by Sumitomo Chemical Co. Ltd.) | 0.908 | 0.9 | 114 |
| Com. Ex. No. | | | | |
| 1 | non-crosslinked linear low density polyethylene (LPLD8020, made by UNIFOS Ltd.) | 0.920 | 1.0 | 121 |
| 2 | non-crosslinked linear low density polyethylene (ULTZEX 3021F, made by Mitsui Petrochemical Ind. Ltd. | 0.930 | 2.0 | 123 |
| 3 | non-crosslinked low density polyethylene (SUMIKATHENE F-213B, made by Sumitomo Chemical Co. Ltd.) | 0.922 | 1.5 | 111 |
| 4 | non-crosslinked linear low density polyethylene (SUMIKATHENE-L GA-803, made by Sumitomo Chemical Co. Ltd.) | 0.920 | 50 | 123 |

TABLE 1-continued

| | Base resin | | | |
|---|---|---|---|---|
| Example No. | Polyethylene resin type | Density (g/cm$^3$) | Melt index (g/10 min.) | Melting point (°C.) |
| 5 | crosslinked linear very low density polyethylene (crosslinking was carried out using 100 parts by weight of EXCELLEN VL-200, made by Sumitomo Chemical Co. Ltd.. with 0.3 part by weight of dicumylperoxide) | 0.900 | 0.5 | 120 |

TABLE 2

| Example No. | Amount of volatile blowing agent (isobutane) (parts by weight) | Inner pressure of vessel (kg/cm$^2$G) | Properties of pre-expanded particles | | | |
|---|---|---|---|---|---|---|
| | | | Average cell diameter ($\mu$m) | Expansion ratio (times) | Endothermic peak temperature difference (°C.) | Inner pressure (kg/cm$^2$G) |
| 1 | 18 | 12.5 | 105 | 22.6 | 22.6 | 1.74 |
| 2 | 20 | 13.3 | 119 | 22.3 | 19.7 | 1.70 |
| 3 | 25 | 14.8 | 154 | 24.2 | 20.4 | 1.84 |
| 4 | 22 | 13.9 | 250 | 21.3 | 15.8 | 1.99 |
| 5 | 20 | 13.5 | 243 | 22.6 | 24.0 | 1.85 |
| Com. Ex. No. | | | | | | |
| 1 | 23 | 14.6 | 250 | 22.0 | 22.2 | 1.72 |
| 2 | 25 | 15.7 | 250 | 28.0 | 16.5 | 1.68 |
| 3 | 23 | 14.8 | 150 | 22.0 | 21.1 | 1.83 |
| 4 | 21 | 15.0 | 370 | 13.6 | 9.1 | 1.90 |
| 5 | 20 | 13.5 | 50 | 17.5 | 17.2 | 2.10 |

TABLE 3

| Example No. | Steam pressure during molding (kg/cm$^2$G) | Properties of cellular molded article | | | | | |
|---|---|---|---|---|---|---|---|
| | | Moldability | Melt bonding | Flexibility | Tensile strength at break | Elongation at break | Overall appraisal |
| 1 | 0.4–0.8 | ○ | ○ | ○ | ○ | ○ | good |
| 2 | 0.4–0.8 | ○ | ○ | ○ | ○ | ○ | good |
| 3 | 0.4–0.8 | ○ | ○ | ○ | ○ | ○ | good |
| 4 | 0.4–0.8 | ○ | ○ | ○ | ○ | ○ | good |
| 5 | 0.4–0.8 | ○ | ○ | ○ | ○ | ○ | good |
| Com. Ex. No. | | | | | | | |
| 1 | 0.6–1.0 | ○ | ○ | Δ | X | X | bad |
| 2 | 0.6–1.0 | ○ | ○ | Δ | X | X | bad |
| 3 | 0.6–1.0 | ○ | ○ | Δ | X | X | bad |
| 4 | 0.6–1.0 | ○ | due to a large amount of shrinkage, it was not possible to obtain a good molded article | | | | bad |
| 5 | 1.0–1.2 | Δ | X | Δ | ○ | ○ | bad |

From the results shown in Tables 1 to 3, it can be seen that in the case of using the pre-expanded particles of Examples 1 to 5 which were prepared from resins based on non-crosslinked linear very low density polyethylenes having densities of from 0.88 to 0.915 g/cm$^3$ and melt indices of from 0.1 to 20 g/10 min., it is possible to obtain cellular molded articles which have superior flexibility, excellent melt bonding of the particles, and both high tensile strength and high elongation at break.

In contrast, the cellular molded articles formed using the pre-expanded particles of Comparative Examples 1 to 3 are inferior to those of Examples 1 to 5 in most properties. In particular, in the case of using a low density polyethylene having a large melt index, as in Comparative Example 4, there is remarkable shrinkage at the time of molding, and it is not possible to obtain a good cellular molded article. Furthermore, when the non-crosslinked LVLDPE used in Example 3 is crosslinked, as in Comparative Example 5, a high steam pressure is required for heating during molding, so that there is a deterioration of the melt bonding of the particles, which is a disadvantage with regard to the molding cycle and molding cost.

As explained above, the polyethylene resin pre-expanded particles of the present invention provide a cellular molded article, having superior flexibility, excellent bonding together of the particles, and moreover, both large tensile strength and large elongation at break. In addition, since the moldability of the pre-expanded particles of this invention allows the production of excellent cellular molded articles at lower pressures of heating medium than used with conventional polyethylene resins, the molding is favorable from the viewpoint of the molding cycle and molding cost. Furthermore, since a crosslinked polyethylene is not used for the pre-expanded particles, recycling can be easily carried out.

In addition to the ingredients used in the Examples, other ingredients can be used as set forth in the specification to obtain substantially the same results.

What is claimed is:

1. A pre-expanded particle of a polyethylene resin which is based on a non-crosslinked linear very low density polyethylene having a density of 0.88 to 0.908 g/cm$^3$ and a melt index of 0.1 to 20 g/10 min.

2. The pre-expanded particle of claim 1 wherein the pre-expanded particle exhibits at least two endothermic peaks on the endothermic curve obtained by raising the temperature of the particle to 200° C. at a rate of 10° C./min. using a differential scanning calorimeter.

3. The pre-expanded particle of claim 2 wherein the temperature difference between the highest temperature peak and the lowest temperature peak on the endothermic curve is not less than 10° C.

4. The pre-expanded particle of claim 1 wherein the pre-expanded particle is produced by a method comprising the following steps:
   (a) dispersing particles of the polyethylene resin in water in a pressure vessel;
   (b) inserting a volatile blowing agent into the pressure vessel;
   (c) heating up the dispersion to a temperature near the melting point of the resin particles to impregnate the resin particles with the blowing agent under a pressure not less than the vapor pressure which the blowing agent shows at that temperature; and
   (d) while maintaining constant the pressure and temperature in the pressure vessel, releasing the mixture of resin particles and water from the pressure vessel into an atmosphere of lower pressure than the pressure in the vessel.

5. The pre-expanded particle of claim 4 wherein the pre-expanded particle exhibits at least two endothermic peaks on the endothermic curve obtained by raising the temperature of the particle to 200° C. at a rate of 10° C./min. using a differential scanning calorimeter.

6. The pre-expanded particle of claim 5 wherein the temperature difference between the highest temperature peak and the lowest temperature peak on the endothermic curve is not less than 10° C.

* * * * *